Patented Mar. 18, 1930

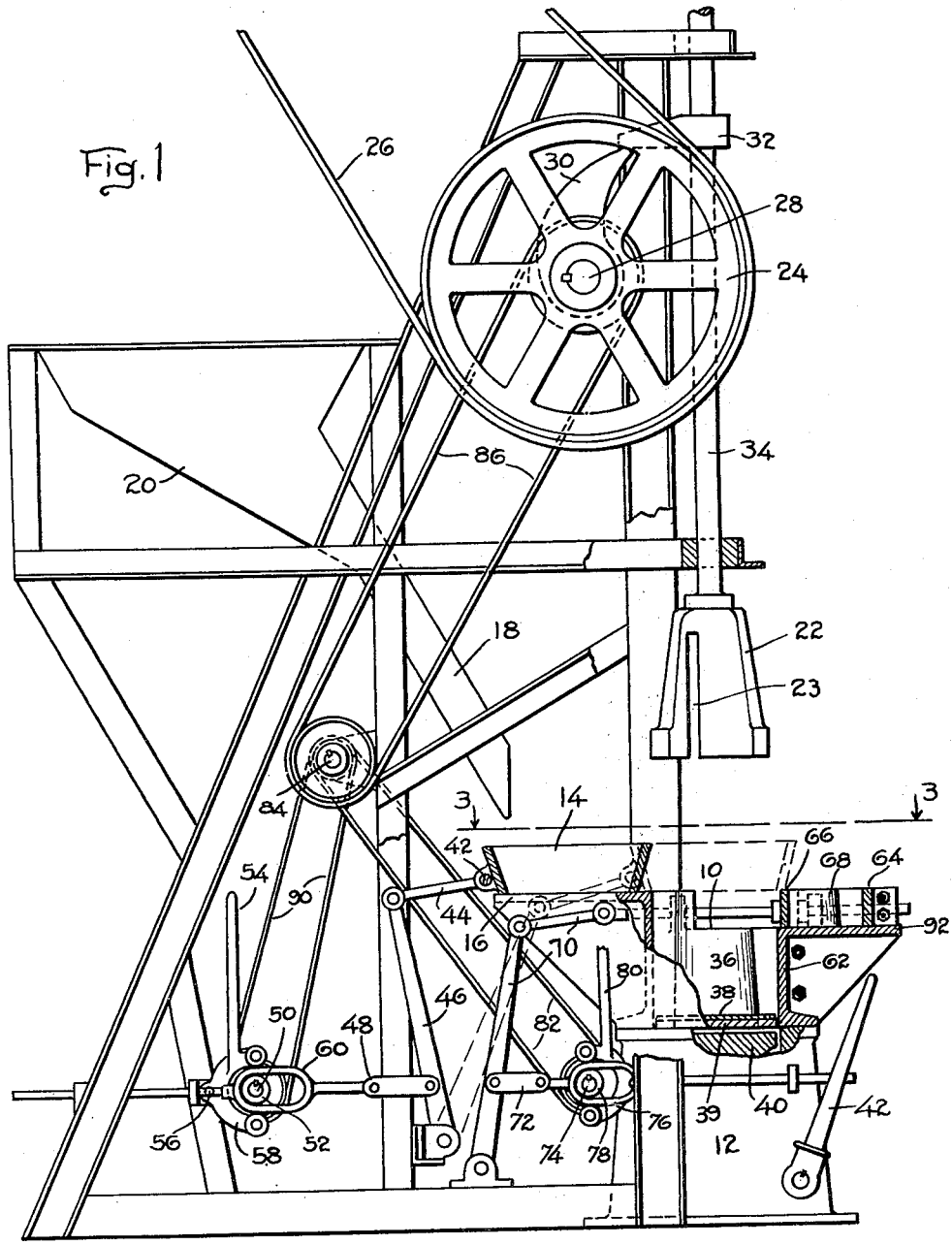

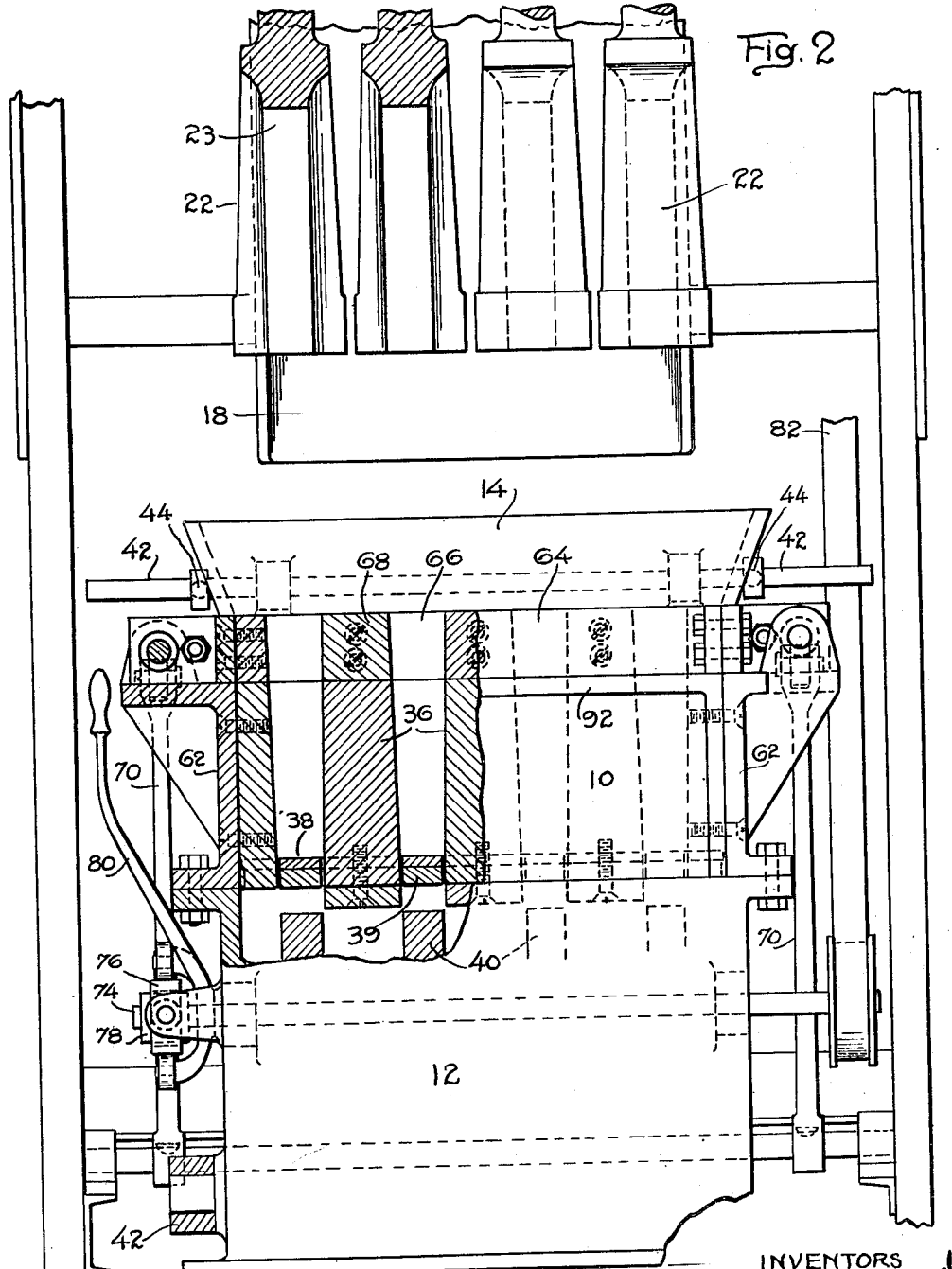

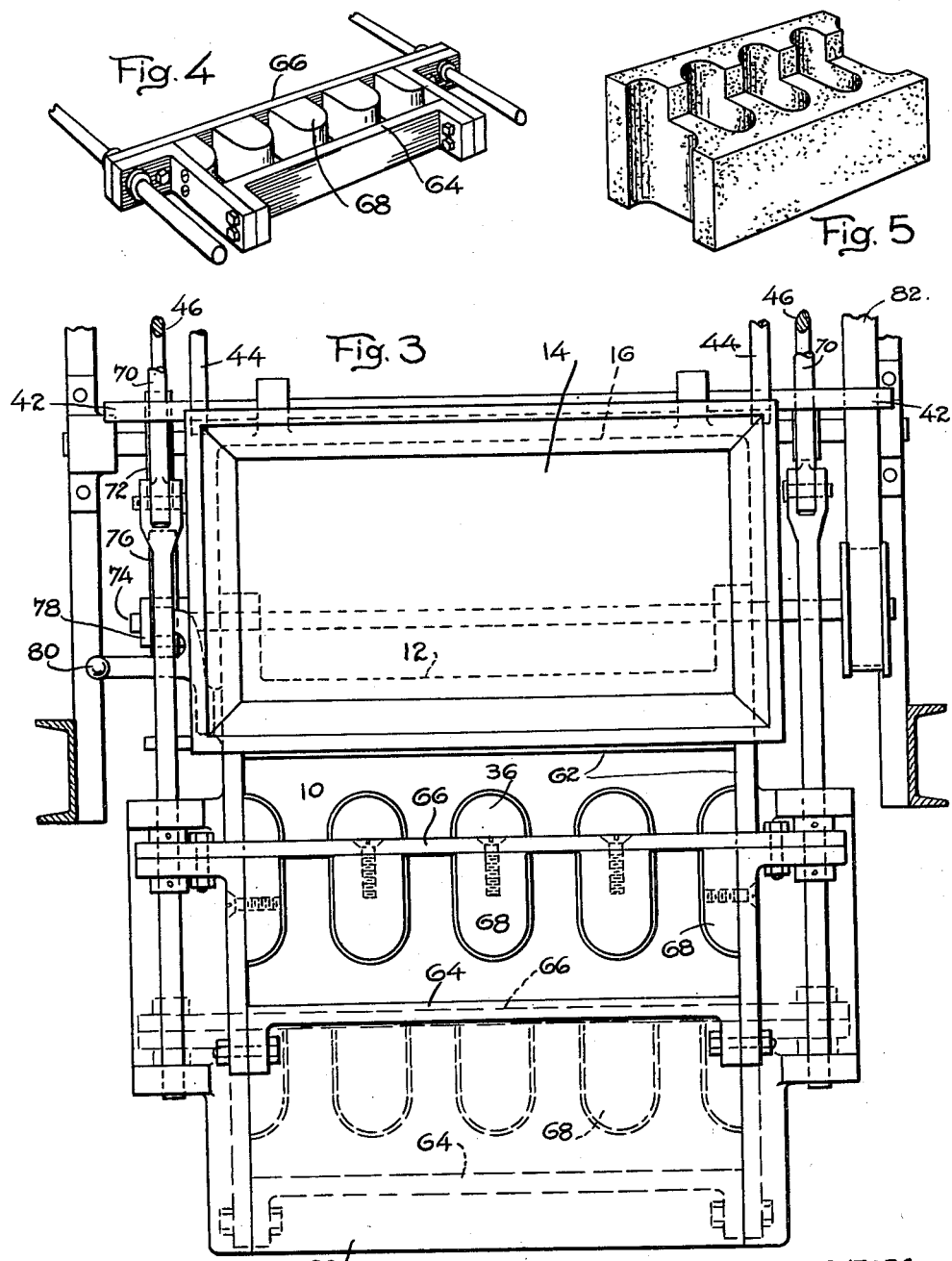

1,751,028

UNITED STATES PATENT OFFICE

THOMAS W. CASWELL AND GEORGE A. KELLY, OF FLINT, MICHIGAN; SAID CASWELL ASSIGNOR TO SAID KELLY

METHOD OF AND APPARATUS FOR MANUFACTURING CONCRETE HEADER BLOCKS

Application filed January 23, 1928, Serial No. 248,680. Renewed October 10, 1929.

This invention relates to an improved method and improved apparatus for the manufacture of concrete header blocks, particularly cinder blocks.

Header blocks of this character have heretofore been formed by hand. Concrete building blocks, other than header blocks, and of the coventional shape have heretofore been manufactured automatically by power machines, but in the manufacture of the header block, a conventional form of which is illustrated in Fig. 6 it has heretofore been the practice to mold these by hand and a filler strip was placed in the mold to correspond with the shoulder of the block and the aggregate was then tamped in the mold and about the filler strip. This necessitated hand work.

The apparatus disclosed herein is adapted to accomplish this function rapidly, automatically, and economically through the use of power driven mechanism.

A block of the conventional substantially rectangular shape and having substantially uniform depth and width dimensions is first molded and then a portion of this block is removed from the mold, such portion being that required to form a block of header shape. The header block is then stripped from the mold and that portion which was first removed is then redeposited in the mold to form a part of the next block.

This method is conveniently accomplished through the employment of the apparatus herein described. This apparatus comprises a mold box having a stationary portion and a removable portion. These two portions combined constitute a mold box adapted to mold a block of substantially rectangular shape corresponding to the commonly used building block. Mechanism is provided to feed aggregate to this mold; to tamp it therein about the cores therein provided; to separate the movable portion of the mold from the stationary portion to remove from the molded block that portion of material necessary to form a block of header shape; to strip the header block from the stationary portion of the mold; and to return the movable portion of the mold to its position of combination with the stationary portion to deposit the aggregate removed thereby back into the mold.

A meritorious feature consists in the provision of a combined mold box of this character having tables arranged on opposite sides at different levels and at substantially the level of the adjacent stationary side of the box in combination with a delivery device supported to travel over the uppermost table to deliver aggregate into the box and mechanism operable to shift the movable portion of the box on to the lowermost table to retain thereon the aggregate confined in such movable portion for redelivery into the mold box to be used as a part of the next block.

Other advantages and meritorious features of this invention will more fully appear from the following description, appended claims and accompanying drawings, wherein—

Fig. 1 is a side elevation partly in section.
Fig. 2 is a front elevation partly in section.
Fig. 3 is a view taken on line 3—3 of Fig. 1 showing a portion of the apparatus in an enlarged plan.
Figs. 4 and 5 are perspectives of a portion of the mold box and a completed block respectively.

Our invention is here shown as embodied in association with apparatus of conventional design wherein there is illustrated a machine for manufacturing concrete cinder blocks having a mold box 10 supported upon a frame 12 and adapted to be supplied intermittently with aggregate by a hopper 14 which travels over a table 16 and which receives aggregate from a delivery spout 18 leading from a suitable source of supply 20.

The aggregate is packed within the mold by tamping devices 22 which are here shown as coupled up for power actuation in a manner well known to the trade. There is a drive wheel 24 which may be driven by a belt 26 from a suitable source of supply and which drives a shaft 28 upon which a cam 30 is supported which engages a part 32 carried by the supporting shaft 34 upon which the tamping member 22 is mounted so as to lift such tamping member. This tamping member may be dropped of its own weight or it might be otherwise actuated.

In Fig. 2 we have shown a plurality of these tamping devices 22 and the mold box is there shown with a plurality of cores 36 which are stationary with the mold box and are provided to produce a block cored out as shown in Fig. 5 and the tamping devices 22 travel downwardly between and around the cores to tamp the aggregate within the mold box.

There is a removable pallet 38, a base plate 39 and plungers 40 adapted to be actuated to lift the pallet through the mold box to eject the block therefrom. I have shown a control lever 43 to accomplish this result.

A hopper 14 may be actuated manually by the handles 42 or it may be power driven through the linkage 44 and 46 which is coupled by a link 48 to be driven off of a shaft 50. The shaft 50 carries a friction drive wheel 52 and a rock lever 54 is provided pivoted at 56 and provided with arms 58 above and below a yoke 60 carried by the link 48 to press this yoke first on one side and then on the other against the friction drive wheel to advance or withdraw the hopper to deliver aggregate into the mold box or to be withdrawn over the table 16 to receive aggregate from the delivery spout 18.

The apparatus described above is of conventional form and well known in the trade. It is commonly used to manufacture cinder blocks other than header blocks.

The instant invention relates to mechanism adapted to manufacture concrete header blocks rapidly and automatically and employs conventional structure such as has heretofore been described in association with certain novel structural features and combinations thereof. The mold box as provided by me consists of a stationary portion 62 and a movable portion 64. The stationary portion has side walls, a floor, which is the pallet, core members 36, and the movable portion has a side wall and end walls and an intermediate wall 66 connecting the end wall portions and carrying core portions 68, which core portions 68 cooperate with the stationary core portions 36. Assembled together the stationary and movable mold portions constitute a complete mold wherein a cinder block of conventional rectangular shape, having substantially uniform depth and width dimensions, may be molded.

The block is molded in this combined mold in the usual manner. After the block is completely molded the movable mold portion is shifted by means of the linkage 70 and link 72 through being connected with a power shaft 74 by a yoke 76 which engages a friction drive member 78 on the shaft and is held thereagainst by a lever 80 as has heretofore been described in connection with the operation of the hopper. This shaft 74 is driven by a belt 82 from a shaft 84 which, in turn, is driven by a belt 86 from the shaft 28 and a belt 90 connects the shaft 84 with the shaft 50 to drive such shaft 50.

After the block has been molded into the shape described, the movable portion of the mold box is shifted as has heretofore been described and it carries with it onto a table 92 the aggregate which is confined therein. This movable portion of the mold box is of a size and shape to remove sufficient aggregate from the block to form a header block such as shown in Fig. 5. This header block is then stripped from the mold.

The movable portion of the mold is then returned to its place in combination with the stationary portion bringing with it the aggregate removed thereby. This aggregate now falls into the mold box or is forced therein by the tamping mechanism to form a part of the immediately succeeding block and the operation is continued. This method is rapid and permits the turning out of header blocks at a high rate of speed and at a low cost which blocks have heretofore been turned out by hand slowly and at a high cost.

The intermediate wall 66, which connects the removable portions of the core 68 to travel with the movable portion of the mold box, is straddled by the tamping devices 22 which is slotted as shown at 23 for this purpose.

It is understood that aggregate of varying character might be employed in the above apparatus and as embodying the process set forth. The method and structure is particularly adapted for use in the manufacture of what is commonly termed cinder blocks and hereafter in the claims where the word "concrete" is used it is employed in this generic sense.

We claim:

1. A header block mold box, having side walls and floor and a core and adapted to receive aggregate to mold a substantially rectangular block, said box having a removable portion including adjacent side wall portions and a connecting intermediate wall portion together with a removable core portion and forming a box-like structure separable as a unit from the mold box to remove that portion of the block bounded thereby to form a block of header shape.

2. A header block mold box having a wall and a core and adapted to receive aggregate to form a block of substantially uniform depth and characterized by having a portion of its wall connected with a portion of the core and separable as a unit from the core and wall of the box to remove that part of the block bounded thereby from the entire block to form a block of header shape.

3. A header block mold box having a stationary wall portion and a removable box shaped wall portion constituting in combination a mold box adapted to mold a block of substantial uniform depth, said stationary wall portion adapted to define the shape of a header block, said movable wall portion adapted to define only that portion of material necessary to be removed from the block molded in the combined mold box to form said header block.

4. A header block mold box within which a block of substantially rectangular shape may be molded provided with a separable subframe portion removable therefrom and adapted upon such removal to remove a portion of said block to form a block of header shape.

5. A header block machine having a mold box within which a block of substantially uniform depth may be molded, means for feeding successive layers of aggregate into said box, means for tamping said successive layers of aggregate thus deposited in the box to mold a block of substantially uniform depth, means comprising a movable portion of the retaining wall of the mold box for removing a portion from said block of uniform depth while it is in the mold to form a block of header shape, and means for stripping the header block from the mold box.

6. A header block machine having a mold box within which a block of substantially uniform depth may be molded, means for feeding successive layers of aggregate into said box, means for tamping said successive layers of aggregate thus deposited in the box to mold a block of substantially uniform depth, means including movable wall portions of the box and a connecting partition wall for removing a portion from said block of uniform depth before it is stripped from the mold box to form a block of header shape and means for stripping the header block from the mold box.

7. A header block machine having a mold box within which a block of substantially uniform depth may be molded, means for feeding aggregate thereinto, means for tamping the aggregate deposited in the box to mold a block of substantially uniform depth, said box provided with a separate wall portion including a partition wall member shiftable as a unit from the mold box to remove that portion of the block bounded thereby before the block is stripped from the mold box thereby forming a block of header shape, means for stripping the header block from the mold box while said movable portion is in the shifted position, and means for returning said movable portion on to the box to deposit the aggregate contained therein into the mold box.

8. A header block machine having a mold box comprising a stationary L-shaped wall adapted to define the shape of a header block, tables arranged on opposite sides of the mold box on a level with the adjacent stationary walls thereof, a movable hopper shiftable over one table to a position above the box to deliver aggregate thereinto, said box provided with a movable wall portion shiftable over the other table to remove aggregate from the box.

9. A header block machine having a mold box provided with tables arranged at different levels and on opposite sides and at the same level as the adjacent side wall on such side of the box, a hopper shiftable over the uppermost table to a position above the box to deliver aggregate thereto, and an element adapted to serve as a wall portion of the box shiftable over the other table to remove aggregate from the box to form a block of header shape, means for stripping the header block from the mold box and means for shifting said element to a position over the box to deposit the aggregate removed thereby back into the box.

10. A header block machine having a mold box comprising a stationary wall portion and a removable wall portion constituting in combination a mold box capable of molding a block of substantially uniform depth, means for feeding aggregate into the combined box structure to mold a block of substantially uniform depth, means for shifting said movable wall portion away from the stationary wall portion to remove a portion of said block to form a block of header shape, means for stripping the header block from the stationary wall portion of the box, and means for shifting said movable wall portion into combined relationship with the stationary wall portion to deposit the aggregate contained therein back into the stationary wall portion of the box.

11. A header block machine having a mold box comprising a stationary wall portion and a generally box shaped movable wall portion constituting in combination a mold box adapted to mold a block of substantially uniform depth, power driven mechanism for feeding aggregate into the box in successive layers, power driven mechanism for tamping the successive layers of aggregate deposited in the box, power driven mechanism for shifting the movable wall portion of the box to remove the aggregate confined therein to form a block of header shape and power driven mechanism for stripping said header block from the stationary wall portion of the mold.

12. A header block machine having a mold box comprising a stationary mold portion including side walls and a core and a movable mold portion constituting in combination with the stationary mold portion a mold box adapted to mold a block of substantially uniform dimensions in depth and width, said movable mold portion comprising as a unit side wall portions, an intermediate wall portion and a core portion, a pallet mounted to support the aggregate block forming material within the box during the molding operation and movable through the mold to strip the block therefrom, feed mechanism to deliver aggregate into the combined mold box, tamping mechanism to tamp the aggregate within the mold to form a block of said substantially uniform dimensions, mechanism operable to shift the movable portion of the mold away from the stationary portion of the mold removing the aggregate confined therein to form a block of header shape, mechanism for moving the pallet through the stationary portion of the mold to strip the header block therefrom, said movable mold portion shifting mechanism operable to return said mold portion into cooperative combination with the stationary mold portion to deliver the aggregate contained therein into said stationary mold portion to form a part of the next block.

13. A header block machine having a mold box comprising a stationary mold portion including side walls and cores and a movable mold portion including side walls, an intermediate wall, and core portions constituting in combination with the stationary mold portion a box adapted to mold a block of substantially uniform depth, a pallet mounted to be advanced through the stationary portion of the mold over the stationary cores to strip the completed block therefrom, power actuated delivery mechanism operable to deposit successive layers of aggregate within the combined mold box, power operated tamping mechanism coordinated in movement therewith to tamp said successive layers of aggregate in the box, power actuated mechanism coordinated in movement therewith to shift the movable portion of the box away from the stationary portion thereof to remove the aggregate contained therein to form a block of header shape and to return said movable portion following the stripping of the header block from the stationary portion of the mold to deposit in said stationary portion the aggregate contained in the movable portion for use in the next block, and power operated stripping mechanism to actuate the pallet to strip the header block from the stationary portion of the mold.

14. A header block mold box having, in combination, a stationary wall portion of header block shape and a removable box shaped wall portion adapted to be combined therewith to serve as a continuation thereof to form a mold box of substantially uniform depth, means for feeding successive batches of aggregate into the combined box, tamping mechanism operable to tamp said aggregate into a block of substantially uniform depth in the combined box and mechanism operable to shift the removable wall portion away from the stationary wall portion to separate the tamped aggregate enclosed thereby from the aggregate contained in the stationary wall portion.

15. A header block mold box having a stationary wall portion adapted to define the shape of the header block and a movable wall portion adapted to cooperate with the stationary wall portion to mold a block of substantially uniform depth and adapted to embrace that portion of such molded block necessary to be removed to form the block of header shape and shiftable away from the stationary wall portion to remove that portion of material embraced thereby.

16. A header block mold box comprising, in combination, a stationary wall portion and a movable wall portion constituting jointly a mold box adapted to define a block of substantially uniform depth, such stationary wall portion adapted to define the shape of the header block, said movable wall portion adapted to be shifted laterally away from the stationary wall portion to remove that portion of the block of uniform depth necessary to be removed to form the block of header shape.

17. A header block machine comprising, in combination, a mold box having a stationary wall portion provided with one side wall of a height different from its opposite side wall, a table arranged adjacent to and substantially on a level with the uppermost side wall, a second table arranged adjacent to and substantially on a level with the lowermost side wall, means shiftable over the uppermost table to deliver aggregate into the mold box and means shiftable over the lowermost table to remove aggregate from the mold box.

18. In a header block machine, a mold box having a retaining wall and a core, a portion of said core being removable, a partition wall extending across the box and connected with the removable portion of the core, said partition wall and removable core portion being shiftable to remove a portion of the material contained within the box to form a block of header shape.

In testimony whereof, we sign this specification.

THOMAS W. CASWELL.
GEORGE A. KELLY.